United States Patent
Diris

(10) Patent No.: US 6,725,034 B1
(45) Date of Patent: Apr. 20, 2004

(54) METHOD FOR SYNCHRONIZING A SPACE TELECOMMUNICATIONS SYSTEM COMPRISING AT LEAST ONE SATELLITE

(75) Inventor: Jean-Pierre Diris, Balma (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 09/601,324

(22) PCT Filed: Feb. 5, 1999

(86) PCT No.: PCT/FR99/00250
§ 371 (c)(1),
(2), (4) Date: Oct. 20, 2000

(87) PCT Pub. No.: WO99/40691
PCT Pub. Date: Aug. 12, 1999

(30) Foreign Application Priority Data

Feb. 6, 1998 (FR) ............................................. 98 01413

(51) Int. Cl.⁷ ................................................ H04Q 7/20
(52) U.S. Cl. .................... 455/427; 455/13.1; 455/13.2; 455/12.1
(58) Field of Search ................ 455/13.1, 13.2, 455/12.1, 427; 370/318, 324; 244/158 R

(56) References Cited

U.S. PATENT DOCUMENTS

| 5,717,404 A | * | 2/1998 | Malla | 342/357.02 |
| 5,790,939 A | * | 8/1998 | Malcolm et al. | 455/13.2 |
| 5,875,402 A | * | 2/1999 | Yamawaki | 455/502 |
| 6,133,872 A | * | 10/2000 | Mitchell et al. | 342/357.1 |
| 6,147,641 A | * | 11/2000 | Issler | 342/357.05 |
| 6,611,683 B1 | * | 8/2003 | Castiel et al. | 455/427 |

* cited by examiner

*Primary Examiner*—William Trost
*Assistant Examiner*—Sharad Rampuria
(74) *Attorney, Agent, or Firm*—Oblon, Spivak, McClelland, Maier & Neustadt, P.C.

(57) ABSTRACT

The invention relates to a method for synchronizing a space telecommunications system comprising at least one satellite and several user terminals, each satellite comprising:

- off-line and real time means (20) delivering tracking measurements;
- a means for processing these measurements so as to smooth them through an orbit model in order to provide accurate orbit restitution and real time synchronization information; and
- a means (21) for transmitting the information to the user terminals (22).

6 Claims, 2 Drawing Sheets

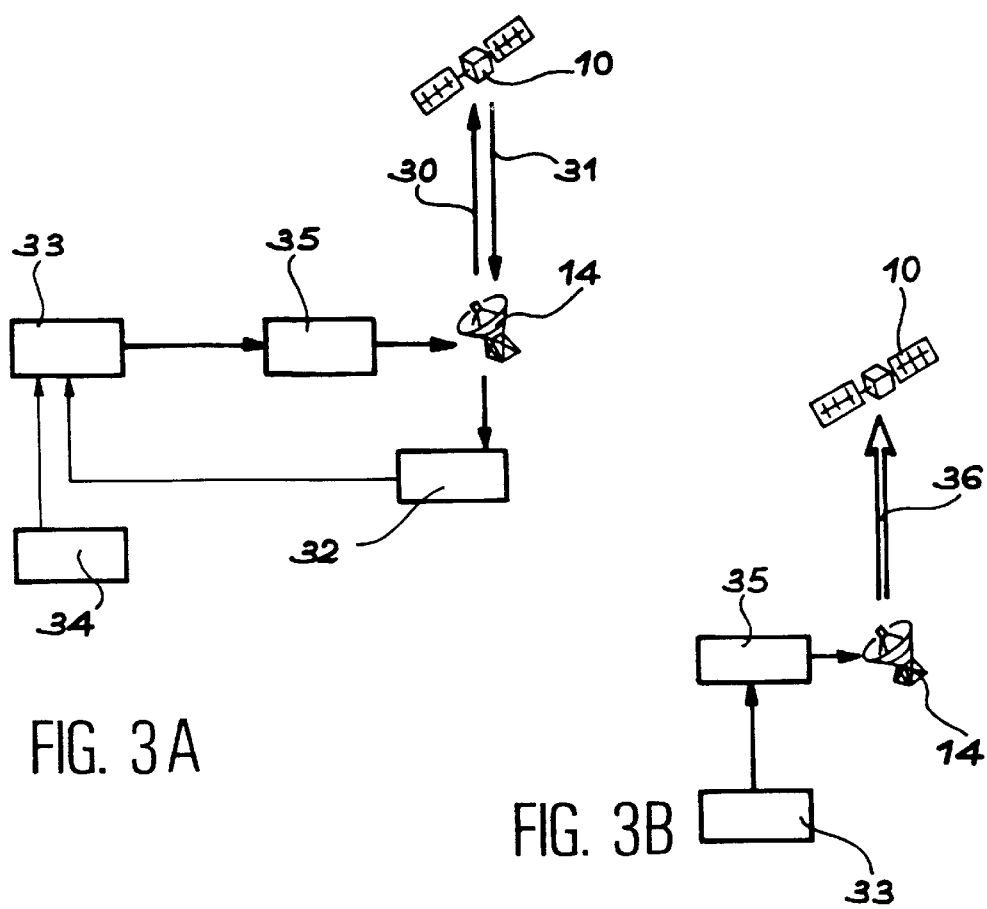
FIG. 3A
FIG. 3B
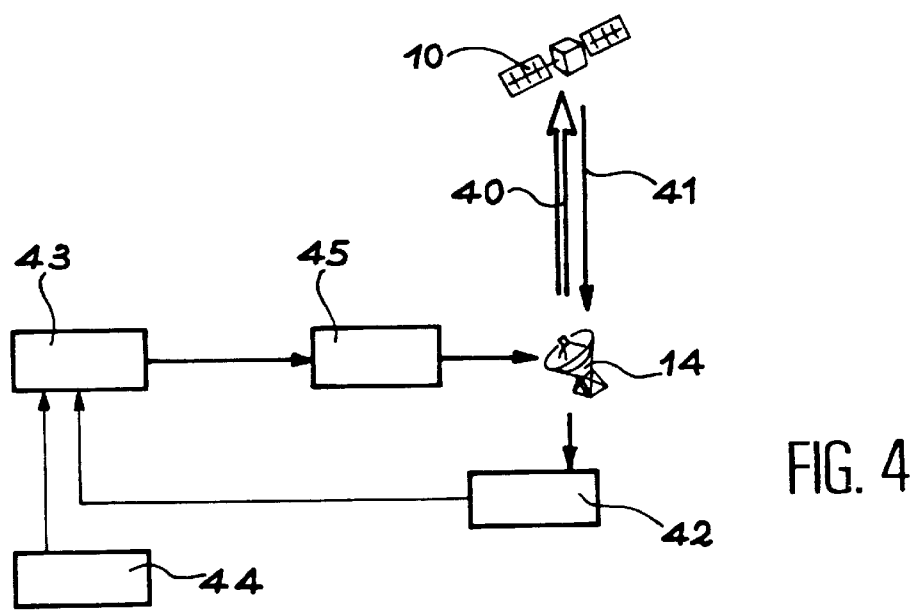
FIG. 4

METHOD FOR SYNCHRONIZING A SPACE TELECOMMUNICATIONS SYSTEM COMPRISING AT LEAST ONE SATELLITE

TECHNICAL FIELD

The invention relates to a method for synchronizing a space telecommunications system comprising at least one satellite.

PRIOR ART

Most space telecommunications systems planned at the present time have synchronization systems the architecture of which is based on satellite/terminal synchronization offset measurements and corrections on up-links and down-links. Such architecture requires complex management on behalf of the satellite or the associated control center of the various user terminals and their synchronization offsets.

The document referenced as [1] at the end of the specification describes various functions involved in "off-line orbit control" as part of a constellation of satellites, namely: determining orbit and time, calculating maneuvers in order to follow the reference orbit, carrying out the maneuvers, controlling maneuvers. The use of satellite positioning systems results in the development of a specific on-board device called "navigator". This device can be based on two types of positioning and synchronizing systems, e.g. the DORIS and GPS systems. This document [1] describes the general hardware features of such a navigator and its interfaces with the satellite.

The document referenced as [2] describes a method and system for synchronizing a communications network, comprising several non-stationary satellites, based on transmissions of preliminary signals composed of bursts.

The object of the invention is a method for synchronizing a telecommunications spaces system comprising at least one satellite of simplified synchronization architecture.

DESCRIPTION OF THE INVENTION

The invention relates to a method for synchronizing a telecommunications spaces system comprising at least one satellite and several user terminals, wherein each satellite comprises: a means for transmitting synchronization information to user terminals; characterized in that each satellite further comprises:
- off-line and real time means delivering tracking measurements;
- a means for processing these measurements so as to smooth them through an orbit model; and in that said method comprises the following steps:
- performing an accurate and real time orbit restitution measurement aboard each satellite;
- transmitting this satellite orbit restitution and reference on-board time to the user terminals;
- each of the user terminals, communicating with a given satellite, then synchronizing its transmissions with this satellite, with respect to satellite time.

Orbit restitution can be based on using Doppler measurements from the DORIS system or using pseudo-distance and pseudo-speed measurements from the GPS system.

Advantageously, each terminal communicating with a satellite performs the following operations:
- identifying the time shift of its time reference with respect to satellite time;
- theoretically calculating the terminal/satellite propagation delay from the measured orbit of the satellite and the terminal position;
- transmitting the terminal/satellite up-link information telecommunications signal at the date required by the satellite, the signal being pre-compensated for Doppler-frequency and synchronization offset time.

The invention is based on the implementation of an accurate and real time orbit tracking means aboard each satellite.

Coupling the accurate on-board orbit and the synchronization architecture of the telecommunications system allows to significantly simplify the payloads of telecommunications satellites and improve the performance of communications systems.

The invention mainly applies to communications systems between a constellation of satellites and numerous user ground terminals. It can also be applied to a telecommunications service provided by one or more non-stationary satellites.

The main advantages of the invention are located at three levels of the telecommunications system: reducing satellite complexity, increasing spectral efficiency of terminal/satellite links, relieving terminal constraints.

Satellite Complexity

The tasks to be performed by each satellite as part of conventional synchronization, which no longer exist in the case of navigator-controlled synchronization according to the invention, are mainly the following ones:
- Measuring the synchronization offset between the satellite and each connected terminal, which requires a set of correlators (hardware).
- Calculating the synchronization offset for each terminal, which requires computing power resources (software, hardware).
- Managing the addresses of the various terminals connected for transferring the synchronization offsets on the down-link, which requires interconnections between the data regenerating and data switching parts at the satellite, thus making its composition more complex (software, hardware).

To this increase in satellite complexity, as part of a conventional synchronization, corresponds, for a navigator-controlled synchronization according to the invention, the mere implementation of an accurate orbit restitution device on each satellite.

Spectral Efficiency

The gain in spectral efficiency is expressed as follows:

|  | Conventional synchronization | Navigator-controlled synchronization as according to the invention |
| --- | --- | --- |
| Down-link | n synchronization information channels per satellite | 1 information channel per satellite for all terminals |
| Up-link | n synchronization channels per satellite | not required | n being the number of terminals connected to a satellite.

The gain in spectral efficiency is certain because, as part of navigator-controlled synchronization like according to the invention, only one down-link per satellite is required, this link being the same for all terminals.

User Terminal

For non-stationary satellites, knowing the accurate orbit of the satellite allows the terminal pointing constraint to be relieved.

Indeed, without such information, the terminal is pointed towards the satellite by means of theoretical ephemerides stored in memory. These ephemerides are somewhat inaccurate, which is harmful to the terminal's pointing record (in addition to the "physical" pointing inaccuracy).

For navigator-controlled synchronization as according to the invention, the terminal receives the highly accurate and real time orbit from the satellite, which allows its pointing procedure to be calculated in a highly accurate way. Then, only the "physical" pointing inaccuracy remains (coupler and actuator related tracking error).

Compared with this terminal simplification, the navigator-controlled synchronization method according to the invention only requires few resources (software) in order to enable each terminal to calculate the satellite/terminal propagation delay.

BRIEF DESCRIPTION

FIGS. 3A and 3B respectively illustrate the synchronization step and the transmission step of a conventional terminal/satellite synchronization method, in closed-loop operation;

FIG. 4 illustrates the single step, grouping synchronization and subsequent transmission, of the navigator-controlled terminal/satellite synchronization method according to the invention, in open-loop operation.

DETAILED DESCRIPTION OF THE EMBODIMENTS

The invention relates to a method for synchronizing a telecommunications system comprising at least one satellite, e.g. a constellation of satellites, using an accurate and real time orbit measurement of each satellite.

The accurate real time orbit aboard each satellite is transmitted to the user terminals, greatly simplifying the telecommunications architecture by enabling each user terminal to synchronize its transmission with respect to satellite time. This accurate orbit is acquired by means of a specific device, called on-board navigator, based on tracking measurements and real time filtering of these measurements by a highly accurate orbit model.

Figure 1:
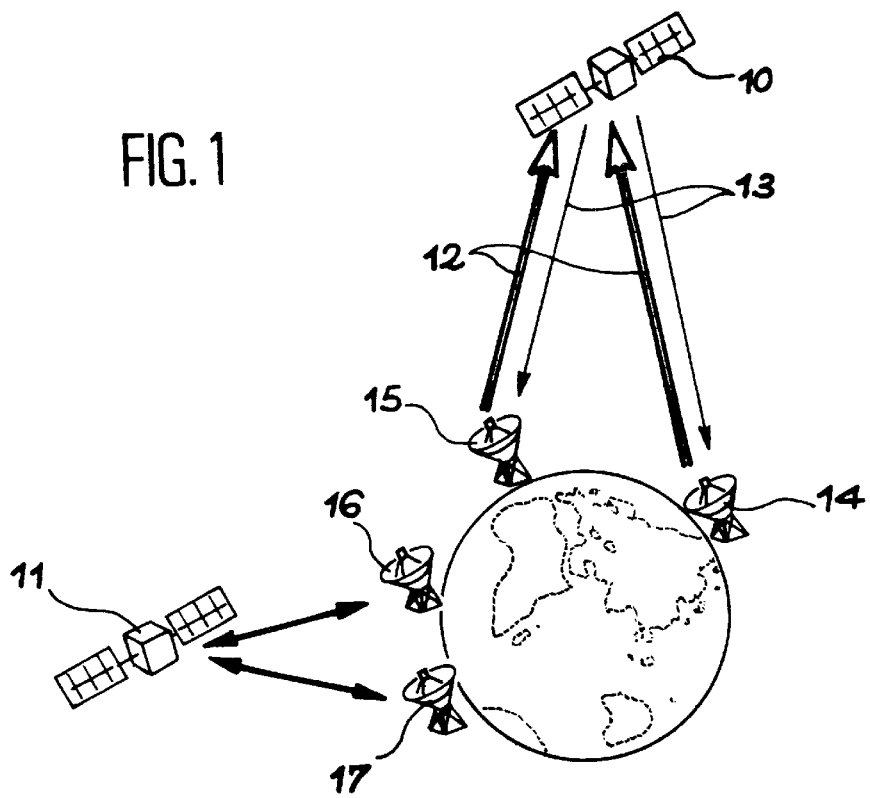
FIG. 1 illustrates the architecture of a telecommunications system.

The proposed architecture of synchronization is illustrated in FIG. 1.

In this figure, two satellites 10 and 11, of a constellation of satellites, are illustrated while communicating with several user terminals 14 to 17.

Aboard each satellite 10, an accurate and real time orbit tracking is computed.

The satellite 10/terminal 14 or 15 down-link contains the orbit information of the satellite and the reference on-board time.

The terminal 14 or 15/satellite 10 up-link 12 is then a pre-compensated communication.

Thus, accurate orbit tracking is performed aboard each satellite, then transmitted to the terminals in the satellite/terminal down-link signal.

The date of transmission required for each terminal is also transmitted by the satellite. Each terminal communicating with the satellite performs the following operations:

identifying the time shift of its reference time with respect to satellite time;

theoretically calculating the terminal/satellite propagation delay from the measured satellite orbit and the terminal position;

transmitting the terminal/satellite up-link information telecommunications signal at the date required by the satellite, this signal being pre-compensated for Doppler frequency and synchronization offset time.

By adopting this synchronization mode, all of the information coming from the terminals reaches the satellite synchronously with respect to the satellite clock. The invention thereby allows to simplify the stages of demodulating and digitally processing the payload of each satellite. Furthermore, each terminal is processed indifferently by the satellite, thus reducing the complexity of the on-board management of each satellite.

On-board Orbit Restitution

The invention is based on the presence aboard the satellites of an off-line means, or on-board navigator, for accurate and real time orbit restitution. Several embodiments of this means can be envisaged, and in particular the following ones:

Orbit restitution is based on using Doppler measurements from the DORIS system, developed and implemented by the CNES ("Centre National d'Etudes Spatiales"). This system comprises a network of fifty-three bifrequency beacons distributed over the terrestrial surface.

Orbit restitution is based on using pseudo-distance and pseudo-speed measurements from the GPS system (or Global Positioning System) of the US Department of Defense. This system comprises a constellation of twenty-four satellites distributed over orbits at 20 200 km, inclined at 55°.

Figure 2:
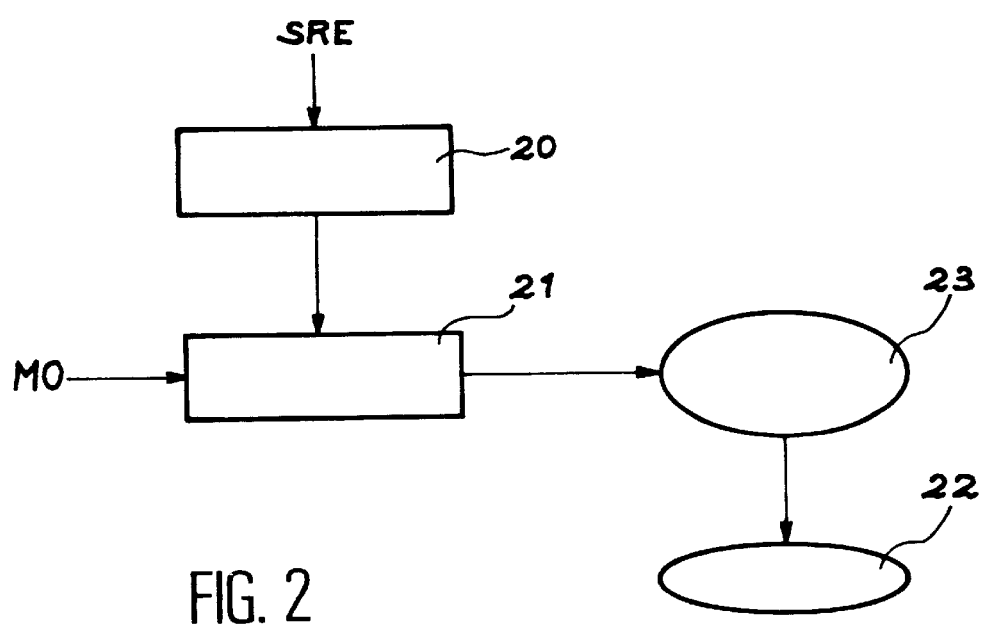
FIG. 2 illustrates the operation of the method for synchronizing a telecommunications system according to the invention.

The generation of the accurate orbit information in the on-board navigator is performed as illustrated in FIG. 2. In this on-board navigator, external radio signals SRE are processed in a measuring signal receiving and generating module 20 (DORIS Doppler, Pd and PvGPS). An orbit filtering module 21 receives these measuring signals as well as an orbit model Mo and delivers real time orbit, dating, and synchronization signals, which are sent to user terminals 22 via the satellite telecommunications payload 23.

Thus, the tracking measurements (DORIS, GPS) are smoothed by an orbit model in order to provide synchronization information: real time accurate orbit, dating, and synchronization with respect to a universal time reference. This information is used directly by the telecommunications payload and transmitted to the user terminals.

The orbit precision, restituted aboard in real time, depends on the orbit of the carrier satellite and can be up to several meters (e.g., in low orbit).

Implementing this function aboard each satellite can be done through a device, or on-board navigator, whereof the layout constraints and associated costs can be adapted to a wide variety of carrier satellites. Indeed, such a device can have a weight of a few kilograms ($\leq 5$ kg), a volume of a few liters ($\leq 5$ L), and consumption of a few dozens of Watt ($\leq 20$ W).

Synchronization Method

The generic need in terms of satellite/user terminal synchronization for communications systems is generally expressed as a need for synchronously receiving aboard each satellite communications coming from the user terminals. This synchronous reception is often called "symbol-synchronous" thereby generating a need for accurate synchronization between the various communications received by the satellite. The invention allows to make the most of the telecommunications links, in particular, by reducing guard bands to a minimum.

In order to carry out this synchronization, a conventional method of conventional terminal/satellite (closed loop) synchronization is used in general, as described for instance in the document referenced as [2], illustrated in FIGS. 3A and 3B: FIG. 3A illustrating a first step of synchronization, and FIG. 3B illustrating a second step of transmission.

In such a method, the terminal is roughly synchronized using its tracking and the theoretical ephemerides of the satellites of the constellation. It then transmits a synchronization frame, which enables the satellite in line of sight to measure its synchronization offset with respect to the terminal. This offset is then transmitted by satellite, via a down-link, to each user terminal that can thus pre-compensate therefor before the next synchronization frame is issued. This synchronization loop can be repeated several times depending on the precision of synchronization to be achieved. It is only once the synchronization has been established for each terminal that a given user terminal can start to communicate with another user terminal (transmission of a communications signal on the up-link).

The detailed operation of a synchronization loop will be explained hereafter.

As illustrated in FIG. 3A, in the synchronization step, terminal 14 sends a synchronization frame 30 (one for each terminal).

Satellite 10 performs a measurement of the real on-board/ground synchronization offset. It then carries out a transmission 31 of the real on-board/ground synchronization offset to the user terminal 14. The signal is received by the receiver 32. A microprocessor 33 receives the real on-board/ground synchronization offset from the receiver 32 and a signal from the local clock 34, and it issues a synchronization frame compensated for real synchronization offset time to a modulation and transmission stage 35. The on-board/ground synchronization offset is thus compensated for.

As illustrated in FIG. 3B, in the transmission step, the microprocessor 33 transmits a communications signal compensated for real synchronization offset time to the transmitter modulator 35. This signal 36 transmitted to the satellite by terminal 14 is a wideband signal.

The proposed invention allows for a simplified embodiment of the synchronization between each satellite and all the user terminals connected thereto, as illustrated in FIG. 4. A single step groups synchronization and subsequent transmission.

Indeed, the real time accurate orbit restitution performed aboard each satellite is transmitted to all of the user terminals. The on-board reference time is also transmitted on the down-link. Each user terminal receives this information and processes it in order to synchronize its local clock to the satellite on-board time.

In particular, the terminal management microprocessor calculates the theoretical satellite/terminal propagation delay using the satellite orbit and terminal positioning information.

The terminal can then transmit its communication directly with another user (on the up-link) by pre-compensating, upon transmission, the synchronization offset between the satellite and the terminal clocks, and the terminal/satellite propagation delay.

As illustrated in FIG. 4 according to the invention, in the same step grouping synchronization and subsequent transmission, the satellite transmits real time orbit and on-board reference time information 41 (identical for all user terminals) to terminal 14. These signals are input at a receiver 42. A microprocessor 43 receives the satellite orbit signals and the on-board time from this receiver 42, as well as a signal produced by a local clock 44. It transmits a signal compensated for on-board/terminal synchronization offset time to a transmitter modulator 45. The terminal 14 then transmits a wideband communications signal 40 to satellite 10.

REFERENCES

[1] "Autonomous Orbit Determination And Control In Constellations Of Satellites" by J. P. Diris, J. Fourcade, C. Jayles, T. Tournier, L. Lefebre, J. Dulac, and N. Dubernet ("Mission Design and Implementation Of Satellite Constellations, 17–19, November, Toulouse, international Astronautical Federation) [2] EP-A-0 632 605 (NEC CORPORATION)

I claim:

1. A method of synchronizing a telecommunications space system comprising at least one satellite and at least two user terminals, each satellite comprising means for transmitting synchronization information to user terminals, means for delivering off-line and real time tracking measurements, and means for processing the tracking measurements to smooth them through an orbit model, said method comprising the steps of:

performing an accurate and real time orbit restitution measurement aboard each satellite;

transmitting the satellite orbit restitution measurement and an on-board reference time to each of the user terminals; and synchronizing transmissions between each of the user terminals and a given satellite of the at least one satellite, with respect to the on-board reference time.

2. The method according to claim 1, wherein is the performing step performs the orbit restitution measurement based on Doppler measurements produced by a DORIS system.

3. The method according to claim 1, wherein the performing step performs orbit restitution measurement based on pseudo-distances and pseudo-speeds produced by a GPS system.

4. The method according to claim 1, wherein each terminal communicating with a the at least one satellite performs the following operations:

identifying a time shift of a time reference of the at least one satellite with respect to satellite time;

theoretically calculating a terminal/satellite propagation delay from the orbit restitution measurement and a terminal position; and transmitting a terminal/satellite up-link information telecommunication signal at a date required by the at least one satellite, the signal being pre-compensated for Doppler frequency and synchronization offset time.

5. A synchronizing system for synchronizing a telecommunications space system comprising at least one satellite and at least two user terminals, each satellite comprising means for transmitting synchronization information to each of the user terminals, means for delivering off-line and real time tracking measurements, and means for processing the tracking measurements to smooth them through an orbit model, said synchronizing system comprising:

means for performing an accurate and real time orbit restitution measurement aboard each satellite;

means for transmitting the satellite orbit restitution measurement and an on-board reference time to each of the user terminals; and means for synchronizing transmissions between each of the user terminals and a given satellite of the at least one satellite, with respect to the on-board reference time.

6. A synchronizing system for synchronizing a telecommunications space system, said synchronizing system comprising:

at least one satellite; and at least two user terminals, wherein each satellite is configured to transmit synchronization information to each of the user terminals, deliver off-line and real time tracking measurements, process the tracking measurements to smooth them through an orbit model, perform an accurate and real time orbit restitution measurement, and transmit the satellite orbit restitution measurement and an on-board reference time to each of the user terminals, and wherein each user terminal is configured to synchronize transmissions to a given satellite of the at least one satellite, with respect to the on-board reference time.

* * * * *